United States Patent
Rao et al.

(10) Patent No.: US 9,509,518 B2
(45) Date of Patent: Nov. 29, 2016

(54) METHOD AND APPARATUS FOR MANAGING JOINING EVENTS FOR G.FAST VECTORING WITH DISCONTINUOUS OPERATION

(71) Applicant: IKANOS COMMUNICATIONS, INC., Fremont, CA (US)

(72) Inventors: Murli Mohan Rao, Fremont, CA (US); Kevin D. Fisher, Palo Alto, CA (US); Laurent Francis Alloin, Monmouth Beach, NJ (US); Avadhani Shridhar, Santa Clara, CA (US)

(73) Assignee: Ikanos Communications, Inc., Fremont, CA (US)

(*) Notice: Subject to any disclaimer, the term of this patent is extended or adjusted under 35 U.S.C. 154(b) by 48 days.

(21) Appl. No.: 14/717,971

(22) Filed: May 20, 2015

(65) Prior Publication Data

US 2015/0341180 A1    Nov. 26, 2015

Related U.S. Application Data

(60) Provisional application No. 62/000,892, filed on May 20, 2014.

(51) Int. Cl.

| | |
|---|---|
| *H04J 1/12* | (2006.01) |
| *H04L 12/12* | (2006.01) |
| *H04B 3/32* | (2006.01) |
| *H04L 5/14* | (2006.01) |
| *H04M 11/06* | (2006.01) |

(52) U.S. Cl.
CPC ............ *H04L 12/12* (2013.01); *H04B 3/32* (2013.01); *H04L 5/1469* (2013.01); *H04M 11/062* (2013.01)

(58) Field of Classification Search
None
See application file for complete search history.

(56) References Cited

U.S. PATENT DOCUMENTS

| | | |
|---|---|---|
| 8,687,497 B2 | 4/2014 | Sands et al. |
| 2012/0224685 A1 | 9/2012 | Schenk et al. |
| 2012/0275591 A1* | 11/2012 | Mahadevan ............ H04B 3/32 379/417 |

(Continued)

FOREIGN PATENT DOCUMENTS

| | | |
|---|---|---|
| JP | 2011529644 A | 12/2011 |
| WO | WO-2004006492 A1 | 1/2004 |
| WO | WO-2010002908 A2 | 1/2010 |

OTHER PUBLICATIONS

ISA/KR, International Search Report and Written Opinion of the International Searching Authority, Int'l Appl. No. PCT/US2015/031840, Sep. 4, 2015, Korean Intellectual Property Office, Daejeon Metropolitan City, KR, 7 pgs.

*Primary Examiner* — Otis L Thompson, Jr.
(74) *Attorney, Agent, or Firm* — Holland & Hart LLP

(57) ABSTRACT

In general, the present invention provides an efficient usage of Far End Crosstalk (FEXT) coefficient memory in a G.fast vectoring system. According to certain aspects, embodiments of the invention provide a simple scheme for efficient management of the Discontinuous (DO) and Regular Operation (RO) FEXT coefficient memories to handle the complexity of lines joining/leaving the system in both regular and DO groups. In embodiments, by disabling the power-efficient, Discontinuous Operation, a G.fast system according to the invention first frees up the DO coefficient memory. Next, the system uses this memory as the staging area to manage joining/leaving events. Finally the system re-enables to the power-efficient Discontinuous Operation and re-populates the DO coefficient memory.

10 Claims, 5 Drawing Sheets

(56) References Cited

U.S. PATENT DOCUMENTS

| | | | |
|---|---|---|---|
| 2012/0281738 A1* | 11/2012 | Clausen | H04B 3/32 375/219 |
| 2013/0215935 A1 | 8/2013 | Nuzman et al. | |
| 2014/0105314 A1* | 4/2014 | Liu | H04B 3/32 375/257 |
| 2014/0112380 A1 | 4/2014 | Sands et al. | |
| 2014/0254791 A1* | 9/2014 | Wei | H04M 11/062 379/406.01 |
| 2015/0055449 A1* | 2/2015 | Li | H04L 1/0072 370/216 |
| 2015/0109970 A1* | 4/2015 | Sorbara | H04L 5/1469 370/278 |
| 2016/0212036 A1* | 7/2016 | Oksman | H04B 3/32 |
| 2016/0248478 A1* | 8/2016 | Troch | G06F 13/4086 |

* cited by examiner

METHOD AND APPARATUS FOR MANAGING JOINING EVENTS FOR G.FAST VECTORING WITH DISCONTINUOUS OPERATION

CROSS-REFERENCE TO RELATED APPLICATIONS

This application claims the benefit under 35 USC 119(e) of prior co-pending U.S. Provisional Patent Application No. 62/000,892, filed May 20, 2014, the disclosure of which is hereby incorporated by reference in its entirety.

FIELD OF THE INVENTION

The present invention relates to generally to xDSL systems, and more particularly to methods and apparatuses for efficiently managing FEXT coefficient memory during joining events for systems supporting G.fast vectoring with Discontinuous Operation.

BACKGROUND OF THE RELATED ART

In 2011, the ITU-T officially began a project to define advanced high speed transmission on twisted pair cables to address high speed transmission on short loop lengths (<250 m) at speeds up to approximately 1 Gb/s aggregate (sum of upstream and downstream rates). The result of this study is ITU-T Recommendation G.9701 (i.e. G.fast), which has since been adopted as a standard, and defines a transceiver specification based on time division duplexing (TDD) for the transmission of the downstream and upstream signals in a wide bandwidth of approximately 106 MHz and a symbol rate of approximately 48 kHz. This contrasts with prior standards such as VDSL2 having a 17.6 MHz bandwidth with a corresponding symbol rates of approximately 4 kHz and 30 MHz bandwidth with a corresponding symbol rate of 8 kHz.

In an effort to obtain power savings in a distribution point unit (DPU) with an option to operate with reverse power feed from the customer premises equipment (CPE), G.fast defines a scheme called discontinuous operation (DO). This allows transceivers on each link to "turn off" system processing to help scale the system power dissipation commensurate with the amount of data traffic being passed. By transmitting data in time slots when data is available and transmitting silence when there is no data available, the equipment power dissipation may be scaled directly with the available user payload data.

Although the power savings of DO is beneficial, it comes at the cost of requiring the vectoring system to maintain a matrix of Far End Crosstalk (FEXT) coefficients for all operating lines in the vectoring group, as well as a separate and distinct matrix of FEXT coefficients for only the lines in the DO group.

Moreover, vectoring systems such as G.fast need to perform a full estimation of the Regular Operation (RO) coefficient matrix every time any line joins or leaves the vectoring group. For example, with N1 lines in the G.fast vectoring system, an (N1×N1) FEXT coefficient matrix is engaged in the vectoring system to achieve full cancellation. As a few more lines join the system, a (N2×N2) coefficient matrix (N2>N1) would need to computed and engaged for full cancellation during RO. This transition from an (N1×N1) to an (N2×N2) matrix is preferably seamless, from one symbol to the next. This atomic switch (on a per-tone basis) is necessary to avoid vectoring-related, joining transients due to second order FEXT coupling. This imposes an additional coefficient memory requirement on the system, in particular for a N2×N2 "staging area", to enable an atomic switch of coefficients from one matrix to another. This staging area is conventionally provisioned in addition to the separate and distinct matrix of FEXT coefficients for lines in the DO group, as well as the existing N1×N1 matrix for the current RO group.

What is needed, therefore, is a scheme that manages this complexity without additional memory requirements.

SUMMARY OF THE INVENTION

In general, the present invention provides an efficient usage of Far End Crosstalk (FEXT) coefficient memory in a G.fast vectoring system. According to certain aspects, embodiments of the invention provide a simple scheme for efficient management of the Discontinuous (DO) and Regular Operation (RO) FEXT coefficient memories to handle the complexity of lines joining/leaving the system in both regular and DO groups. In embodiments, by disabling the power-efficient, Discontinuous Operation, a G.fast system according to the invention first frees up the DO coefficient memory. Next, the system uses this memory as the staging area to manage joining/leaving events. Finally the system re-enables to the power-efficient Discontinuous Operation and re-populates the DO coefficient memory.

In accordance with these and other aspects, a method for managing an event of a line joining or leaving in a G.fast communication system according to embodiments includes detecting the event during a Discontinuous Operation (DO) period, engaging a Regular Operation (RO) far end crosstalk (FEXT) coefficient matrix for use in performing vectoring in a plurality of symbol periods subsequent to the event in the DO period, and using a DO FEXT coefficient matrix to encode an updated RO coefficient matrix in view of the event.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Notably, the terminology used in the present specification is driven by preferred embodiments based on the G.fast (G.9701) standard. However, the present invention is not limited to such embodiments, and the concepts of the invention are applicable to any time division duplexed multicarrier based vectoring system other than G.fast.

The present inventors recognize that Discontinuous Operation (DO) defined by the G.fast standard requires the vectoring system to maintain an additional set of coefficient memory for both Down-stream DO and Upstream DO sub-matrices. According to certain aspects, therefore, embodiments of a vectoring system according to the invention uses this additional coefficient memory for the coefficient update staging area as outlined in more detail below.

Figure 1:
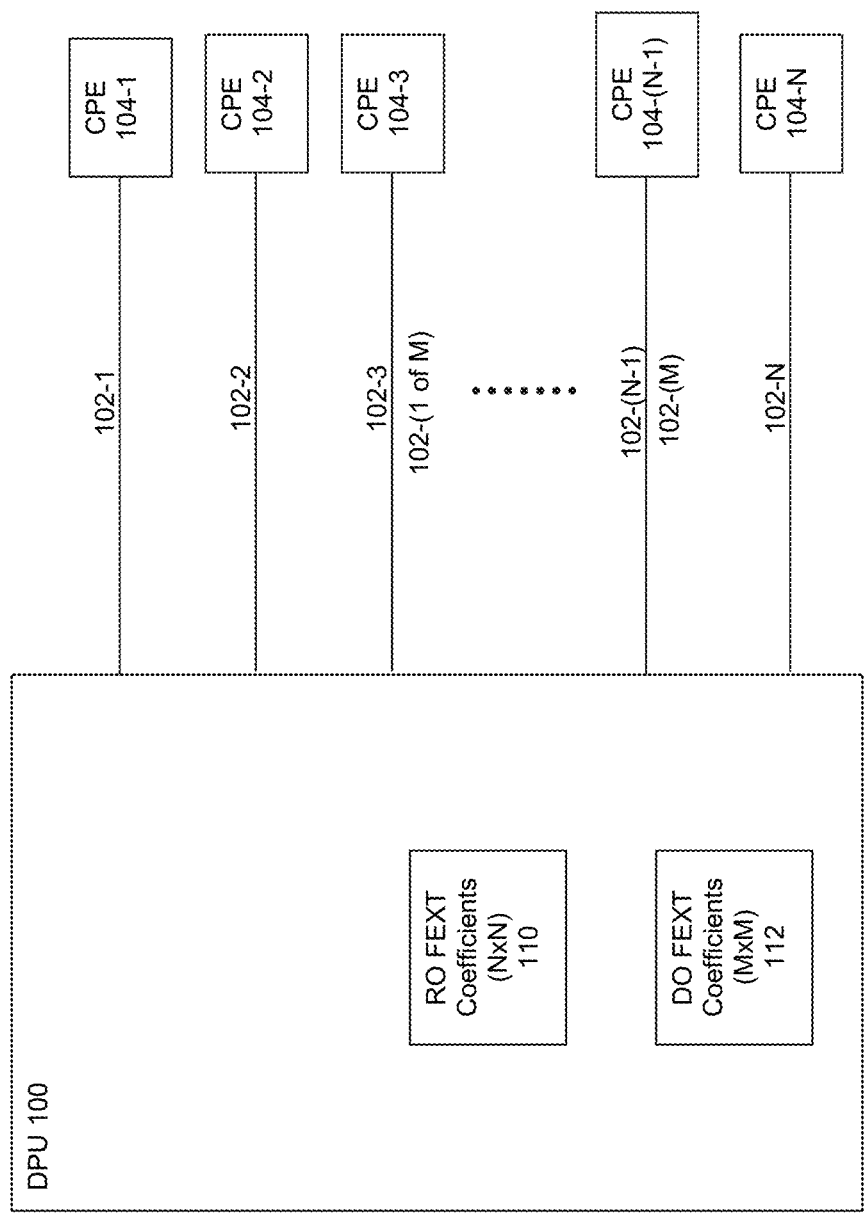
FIG. 1 is a block diagram illustrating an example G.fast vectoring system supporting DO according to embodiments of the invention.

An example G.fast system implementing DO according to embodiments of the invention is shown in FIG. 1. As shown, the system includes a distribution point unit (DPU) 100 having a full RO vectoring group of N lines 102-1 to 102-N respectively coupled to CPEs 104-1 to 104-N. Of this full set of N lines, a subset of M lines (102-1 of M to 102-M) is designated by the DPU as belonging to a DO group.

As is known, during each TDD frame of the G.Fast system (e.g. comprising 36 symbols), all N lines in the system participate in RO for a certain number of symbols (e.g. 4 downstream (DS) symbols of 32 DS symbols per TDD frame), while only the M lines in the system (M<N) participate in DO (e.g. 28 DS symbols per TDD frame), during which symbol periods the remaining N-M lines transmit only quiet symbols to save power. As such, the DPU 100 needs to maintain different sets of FEXT coefficients for the RO group (e.g. N×N matrix of FEXT coefficients 110) and for the DO group (e.g. M×M matrix of FEXT coefficients 112). It should be noted that although only one set of coefficients is shown for each group, there typically needs to be different sets of coefficients for upstream and downstream communications. Moreover, it is possible that there can several different DO groups at the same time, or at different times.

During operation, before each symbol period, the DPU 100 engages the appropriate RO matrix 110 or DO matrix 112 to perform vectoring for all of the lines that are active during the subsequent symbol period.

As set forth above, an aspect of the invention is allowing the matrices 110 and 112 to be managed and updated without the use of a separate memory used as a staging area. In general, by disabling the power-efficient, Discontinuous Operation, a G.fast system according to embodiments of the invention first frees up the DO coefficient memory 112. Next, the system uses this memory as the staging area to manage joining/leaving events. Finally the system reverts back to the power-efficient Discontinuous Operation and re-populates the DO coefficient memory.

Embodiments of the invention will now be described in more detail primarily in connection with the downstream operation where the equipment in the distribution point unit (DPU) is all centrally located and the transceivers may be controlled by a central processor in the DPU. The customer premises transceivers are all distributed to different (disparate) locations. Since upstream crosstalk cancellation is done with post cancellation processing in the DPU, discontinuous operation on each line may be rendered autonomous. However, the invention is not limited to downstream operations, and the principles described herein for the downstream may also be applied to the upstream channel using coordinated upstream flow control, for example.

Figure 2:
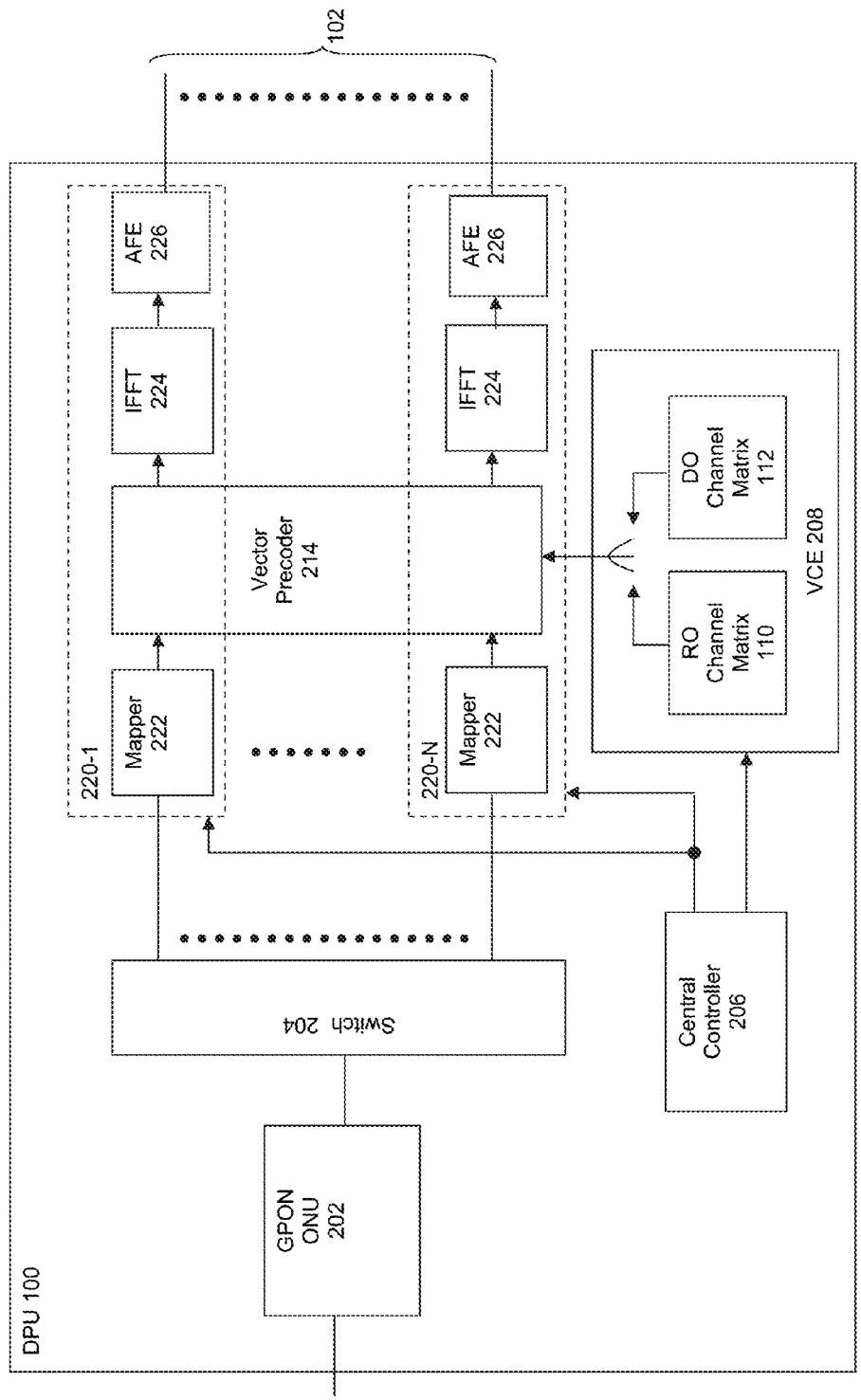
FIG. 2 is a block diagram illustrating an example DPU in accordance with embodiments of the invention.

A block diagram illustrating an example DPU 100 for implementing aspects of the present invention is shown in FIG. 2. As shown, DPU 100 includes a fiber optic transceiver (GPON ONU) 202, a switch 204, a central controller 206, a vector control entity (VCE) 208 which maintains a RO channel matrix 110 and a DO channel matrix 112, a vector precoder 214 and N G.fast transceivers 220-1 to 220-N.

As is known, during downstream TDD frames, transceivers $220$-$j$ (where j=1, 2, . . . , N) map user data received from GPON ONU 202 and switch 204 to frequency domain symbols using mapper 222 (for each line supported by the DPU). To perform vectoring, vector precoder 214 adjusts the symbols before they are converted to time domain by IFFT 224 and then to analog signals by AFE 226. When DO is enabled, vector precoder 214 uses either RO channel matrix 110 or DO channel matrix 112, as controlled by VCE208. According to aspects of DO, the key elements of FIG. 1 to consider are the G.fast transceivers 120 and the vector precoder 112. The power dissipation of these blocks will be reduced by the DO being enabled.

It should be noted that FIG. 2 illustrates components for downstream transmissions for ease of illustrating aspects of the invention. However, DPU 100 typically also includes components for facilitating upstream communications, as should be apparent to those skilled in the art. Similarly, transceivers 220 are illustrated as including downstream path components such as mapper 222, IFFT 224 and AFE 226 for ease in illustrating certain aspects of the invention as set forth in more detail below. However, it should be understood that transceivers 220 can include additional components not shown in FIG. 2, including components for facilitating both upstream and downstream communications.

Central controller 206, VCE 208, vector precoder 214 can be implemented by processors, chipsets, firmware, software, etc. such as NodeScale Vectoring products provided by Ikanos Communications, Inc. Those skilled in the art will be able to understand how to adapt these and other similar commercially available products after being taught by the present examples.

Meanwhile, G.fast transceivers 220 include conventional processors, chipsets, firmware, software, etc. that implement communication services such as those defined by the G.fast Recommendation, as adapted for use in the present invention. Those skilled in the art will be able to understand how to adapt such conventional G.fast products after being taught by the present examples.

It should be noted that, although shown separately for ease of illustration, some or all of components 206, 208 and 220 may be incorporated into the same chips or chipsets. It should be further noted that, although not illustrated here, transceivers 220 communicate with CPE transceivers also including conventional processors, chipsets, firmware, software, etc. that implement communication services such as those defined by the G.fast standard, as adapted for use in the present invention. Those skilled in the art will be able to understand how to adapt such G.fast products after being taught by the present examples.

Figure 3:
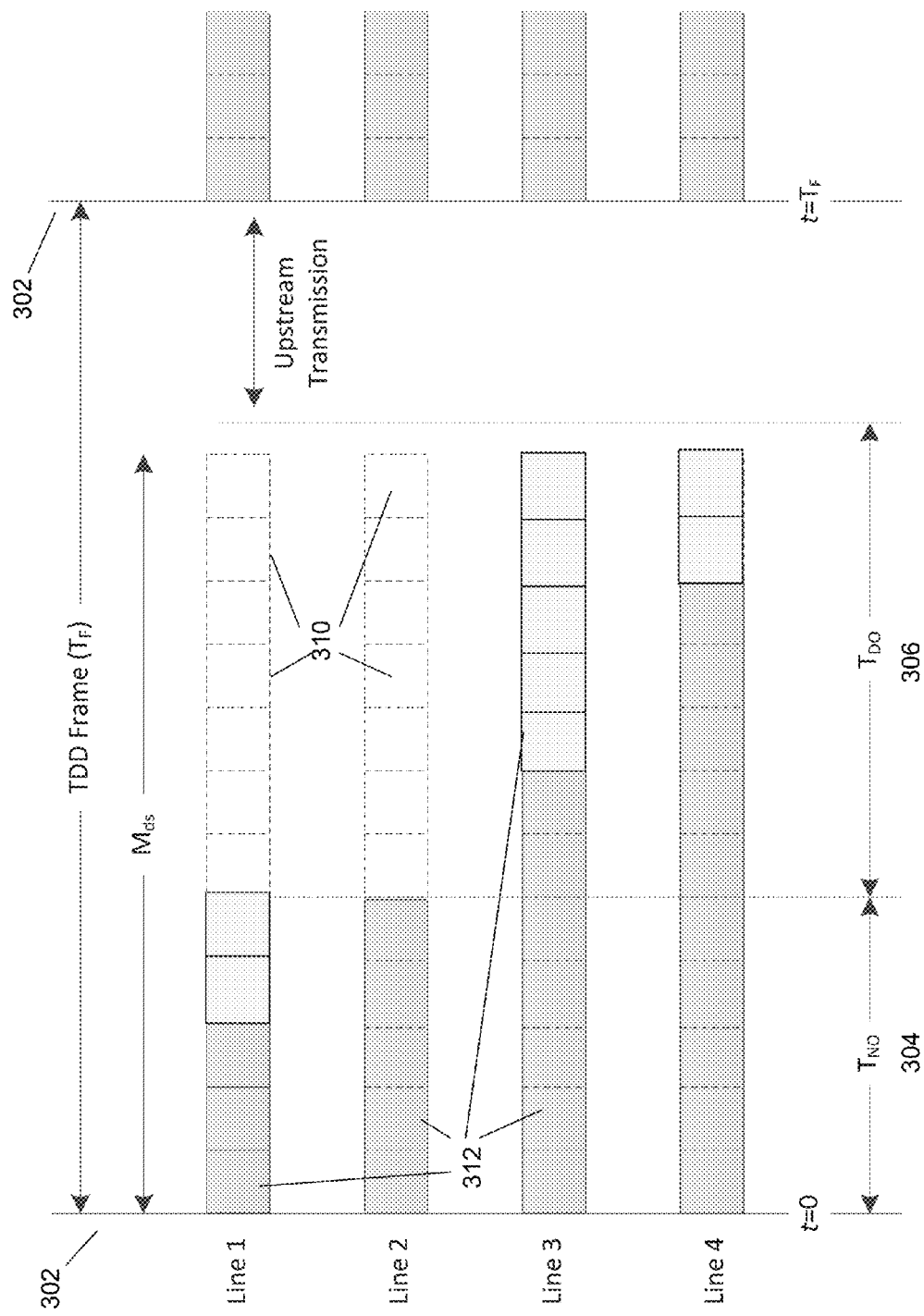
FIG. 3 is a diagram illustrating example aspects of implementing DO in accordance with embodiments of the invention.

FIG. 3 shows an example of DO being performed when vectoring is enabled in a DPU supporting four lines (i.e. N=4). As shown in this example, to enable vectoring, the TDD frame boundaries 302 are all aligned on all the lines in the vector group. FIG. 3 shows two time regions: $T_{NO}$ 304 for RO where all of the lines in the vector group are transmitting data symbols 312 in each of the time slots; the other region $T_{DO}$ 306 for DO, which has a mixture of lines transmitting data 312 and quiet symbols 310.

It should be noted that, as mentioned previously, descriptions herein focus on transmission in the downstream direction. The crosstalk cancellation in the upstream direction is done with post cancellation processing in the upstream receiver. However, the principles described here for the downstream may also be applied to the upstream channel using coordinated upstream flow control, and so the invention includes such upstream embodiments as well.

It should be further noted that the "transmission" of quiet symbols does not actually involve the formation of any symbols by transceiver 220 nor any transmission of energy on the line. Rather, the transceiver is merely biased in such a manner as to maintain the same termination impedance it has on the line when it is transmitting data. Transmission of a quiet symbol effectively turns off the process of the transceiver for the symbol period resulting in power savings relative to the case where the transceiver is sending a data symbol.

In the example of FIG. 3, to enable vectoring, during RO 304, the VCE 208 causes precoder 214 to perform full 4×4 pre-coding for downstream crosstalk cancellation using matrix 110. Thus, the system is operating with full throughput maximum performance, while also dissipating the maximum power dissipation. For the DO region 306, the central controller 206 optimally configures the time slots for proper balance between system performance and power dissipation savings. Accordingly, in this example, during symbol periods in the DO region 306, the central controller 206 causes the VCE 208 to engage the DO channel matrix 112 so that the downstream pre-coder 214 uses a 2×2 configuration for cancelling the crosstalk between lines 3 and 4, while configuring the transceivers 220 for lines 1 and 2 to transmit only quiet symbols. For the 2×2 pre-coder configuration, it can be assumed that some power saving is achieved in the precoder 214 as compared with the full 4×4 configuration for the corresponding period of time since fewer operations were executed.

It should be noted that the configuration of the channel matrix and pre-coder 214, as well as the number of time slots in the DO region 306 can be dependent on the amount of data required for transmission during the TDD frame. The central controller 206 monitors the activity on the transmit buffers in transceivers 220 to help determine the configuration of time slots and the pre-coder. The algorithms used by controller 206 to determine the optimal balance between performance and power dissipation savings can be implementation dependent, and those skilled in the art will be able to implement various such algorithms after being taught by the present examples.

Figure 4:
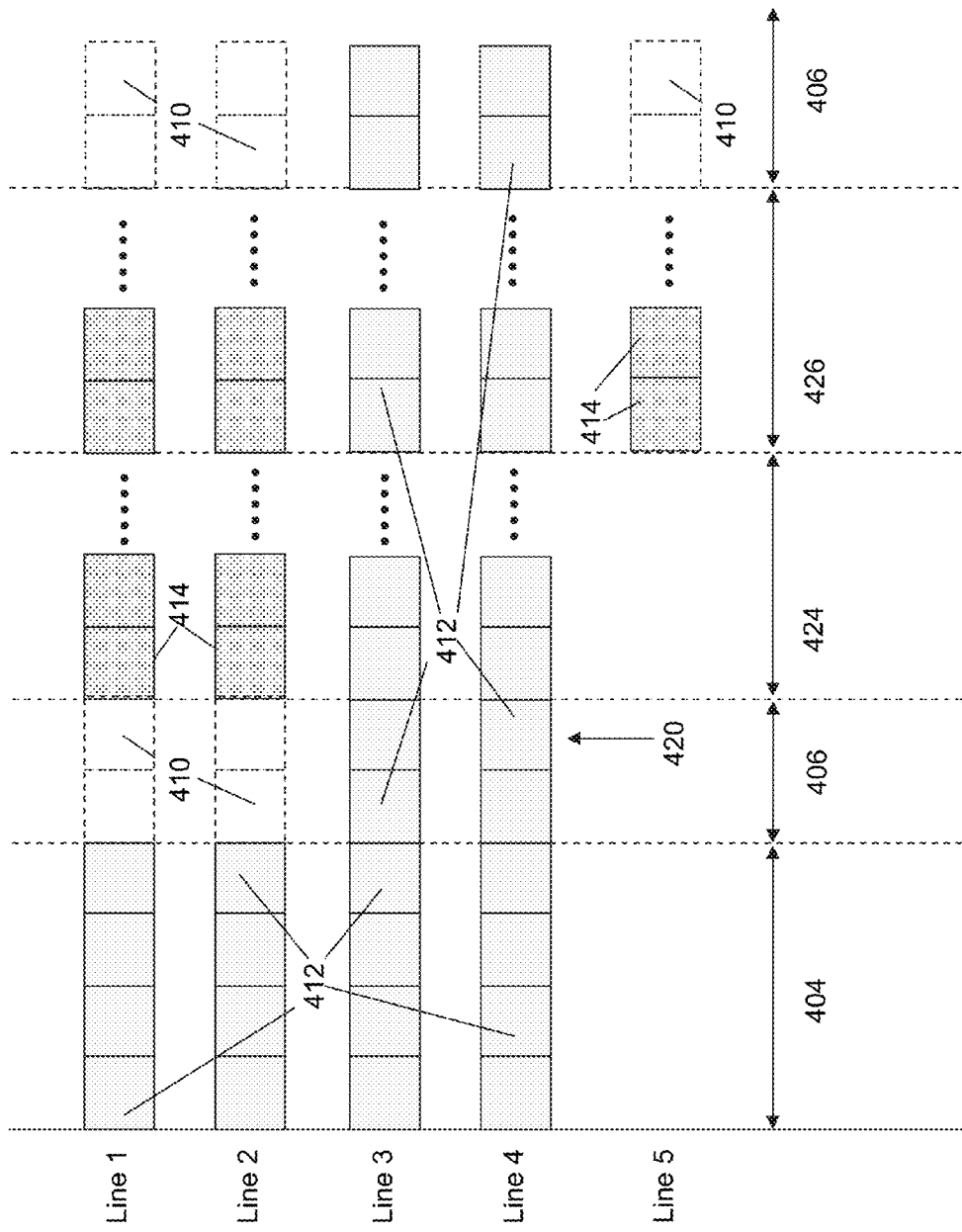
FIG. 4 is a diagram illustrating example aspects of managing DO joining events in accordance with embodiments of the invention.

FIG. 4 is a diagram for illustrating aspects of managing joining events according to embodiments of the invention. FIG. 4 illustrates operation of a G.fast vectored system such as that shown in FIG. 3. As in that example, to enable vectoring of the four active Lines 1-4, during RO 404, while all lines are transmitting data symbols 412, the VCE 208 causes precoder 214 to perform full 4×4 pre-coding for downstream crosstalk cancellation using matrix 110. For the DO region 406, the central controller 206 causes the VCE 208 to engage the DO channel matrix 112 so that the downstream pre-coder 214 uses a 2×2 configuration for cancelling the crosstalk between lines 3 and 4 which continue to transmit data symbols 412, while configuring the transceivers 220 for lines 1 and 2 to transmit only quiet symbols 410.

FIG. 4 further illustrates managing a joining/leaving event in the system that affects either the number of N lines in the RO group or M lines in the DO group according to embodiments of the invention. In this example, an additional Line 5 signals to join the system in a symbol 420 during DO region 406.

As shown in FIG. 4, controller 206 suspends the power-efficient DO operation and begins power-inefficient DO operation in period 424 in the symbol period subsequent to the joining notification 420. In contrast to power-efficient DO operation, the VCE 208 engages the full RO coefficient matrix 110, with the Lines 1 and 2 that are not in the DO group transmitting pre-coded IDLE symbols 414 while DO group Lines 3 and 4 continue to transmit data symbols 412. This frees up the memory used for the DO coefficient matrix 112.

In period 424, the VCE 208 uses the memory previously used for the DO coefficient matrix 112 as the staging memory to encode the updated full N+1×N+1 coefficient matrix. It should be appreciated that the encoding process can extend over many TDD frames. In the DO period 406 in each of these TDD frames, the Lines 1 and 2 that are not in the DO group continue to transmit IDLE symbols instead of quiet symbols.

After the new full RO matrix has been encoded, pointers to the memories associated with RO coefficient matrix 110 and DO coefficient matrix 112 are switched such that the updated RO coefficient matrix 110 can be engaged by the VCE 208 before the beginning of the next TDD frame when Line 5 is allowed to actually join the RO group.

During period 426, the coefficients in the DO matrix 112 are re-computed. It should be appreciated that this can take several TDD frames. Also during period 426, to enable vectoring of all Lines 1-5, the updated RO coefficient 110 is engaged by the VCE 208. As further shown in FIG. 4, during all DO periods in period 426, Lines 1 and 2, which are not in the DO group, continue to transmit IDLE symbols 414, while the new Line 5 has been designated as not belonging in the DO group in this example, and so it also begins to transmit IDLE symbols 414.

Finally, in the first symbol of the first DO period of a TDD frame after the new DO coefficient matrix is computed, VCE 108 engages the updated DO matrix 112 and the system resumes power-efficient DO operation 406, with quiet symbols 410 being transmitted by lines not in the DO group (Lines 1, 2 and 5 in this example).

It should be noted that the above example describes updating the downstream coefficient matrices during an event where a line requests joining the system during a downstream DO operation. Those skilled in the art will appreciate that the upstream coefficient matrices can be updated for the new line during subsequent transmissions using similar processing as described for the downstream coefficient matrices, and will further understand how to manage a line drop event after being taught by these examples.

Figure 5:
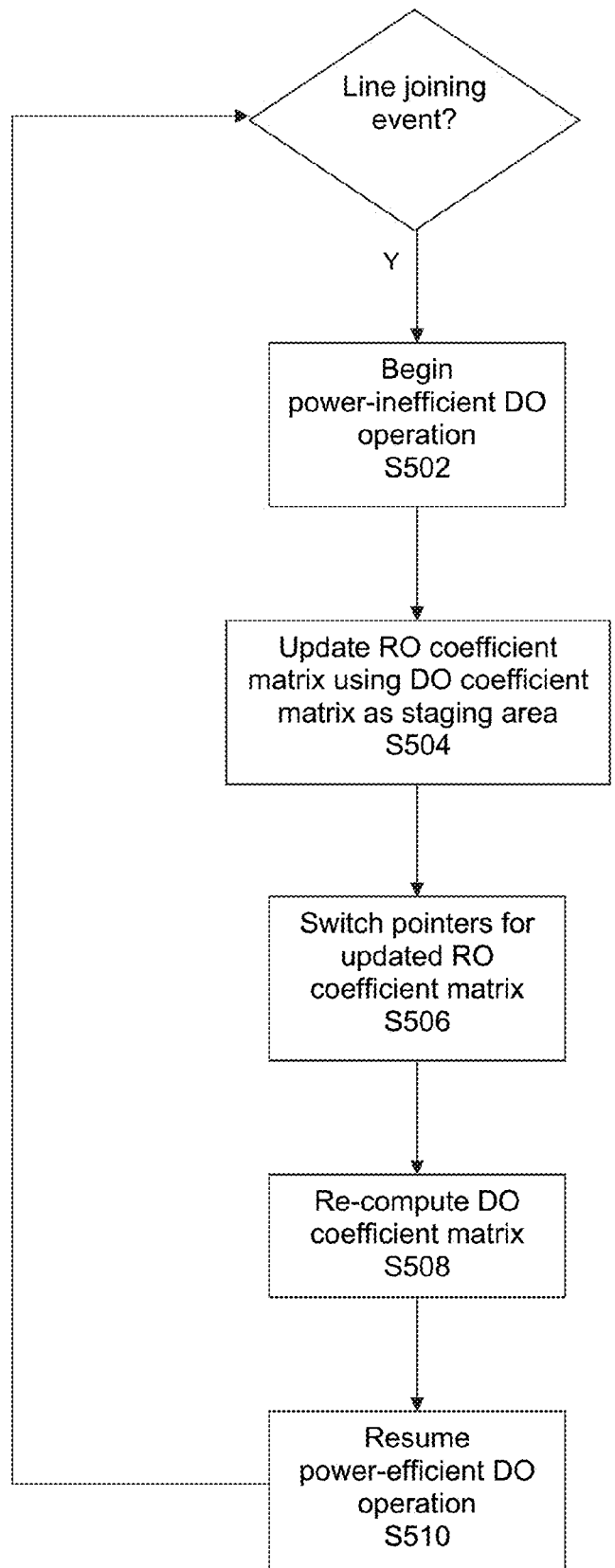
FIG. 5 is a flowchart illustrating example aspects of managing DO joining events in accordance with embodiments of the invention.

FIG. 5 is a flowchart illustrating aspects of managing joining/leaving events according to embodiments of the invention in alternative detail.

As in the previous example, this flowchart illustrates an example method of managing a new line requesting to join an existing N×N system during downstream Discontinuous Operation having a DO group of M lines such as that shown in FIG. 1.

In a first step S502, the system suspends the power-efficient DO operation and begins power-inefficient DO operation. More particularly, as described above, during power-efficient DO operation, the VCE 208 engages the smaller sub-matrix 112 with N-M lines that are not in the DO group transmitting quiet symbols (i.e. no power). During power-inefficient DO operation according to the invention, however, the VCE 208 engages the full matrix 110, with the N-M lines that are not in the DO group transmitting pre-coded, IDLE symbols. This frees up the memory used for the DO coefficient matrix 112.

In embodiments, the IDLE symbol is constructed using the (0,0) point of the direct channel constellation. No user data is transmitted on the line during time slots corresponding to IDLE symbols but sending such an IDLE symbol effectively causes the transceiver 220 to send crosstalk cancellation signal energy from other lines in the vector group to provide downstream crosstalk cancellation. It should be noted that IDLE symbols therefore differ from quiet symbols in that the idle symbols are actually adjusted by vector precoder 214 and converted to time domain signals by IFFT 224 for transmission on the associated lines, whereas quiet symbols do not result in any signals actually being transmitted.

In a next step S504, the system uses the memory previously used for the DO coefficient matrix 112 as the staging memory to encode the updated full coefficient matrix for the new full RO group of N+1 lines. This process can take several TDD frames. As is known, G.fast describes mechanisms to estimate the full RO matrix using Sync symbols and errors associated with the Sync symbols communicated by downstream CPE's, and embodiments of the invention can use these mechanisms. Further details thereof will be omitted here for sake of clarity of the invention.

In a next step S506, after the new full RO matrix has been encoded, pointers to the memories associated with RO matrix 110 and DO matrix 112 are switched such that the updated N+1×N+1 RO coefficient matrix 110 can be engaged by the VCE 208 before the next TDD frame when the new line actually joins the RO group.

In a next step S508, the coefficients in the DO matrix 112 are re-computed. In embodiments, this is done by deriving the coefficients from the RO matrix 110 using conventional approaches such as those described in connection with co-pending application Ser. No. 14/717,947, filed May 20, 2015.

Finally, preferably in the DO portion of next TDD frame after the new DO coefficient matrix is computed, in step S510, the VCE 208 engages the updated DO matrix 112 and the system resumes power-efficient DO operation.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

The invention claimed is:

1. A method for managing an event of a line joining or leaving in a G.fast communication system, the method comprising:
   detecting the event during a Discontinuous Operation (DO) period;
   engaging a Regular Operation (RO) far end crosstalk (FEXT) coefficient matrix for use in performing vectoring in a plurality of symbol periods subsequent to the event in both DO and RO periods;
   freeing up memory used by a DO FEXT coefficient matrix; and
   using the freed-up memory to encode an updated RO coefficient matrix in view of the event.

2. A method according to claim 1, wherein the G.fast communication system has a plurality of RO lines, a subset of which RO lines are designated as a DO group of lines, the method further comprising causing the RO lines that are not in the DO group of lines to transmit IDLE symbols during the plurality of subsequent symbol periods instead of quiet symbols.

3. A method according to claim 1, further comprising:
   switching pointers between the RO FEXT coefficient matrix and the updated RO coefficient matrix after the updated RO coefficient matrix has been encoded; and
   encoding an updated DO FEXT coefficient matrix in view of the event after the updated RO FEXT coefficient matrix has been encoded.

4. A method according to claim 3, further comprising:
   engaging the updated DO coefficient matrix for use in performing vectoring in a next DO period after the updated DO coefficient matrix has been encoded.

5. A method according to claim 4, further comprising:
   causing the RO lines that are not in the DO group of lines to transmit quiet symbols during the next DO period instead of IDLE symbols.

6. A G.fast communication system comprising:
   a Regular Operation (RO) far end crosstalk (FEXT) coefficient matrix;
   a Discontinuous Operation (DO) FEXT coefficient matrix;
   a central controller that detects an event of a line joining or leaving the system during a DO period;
   a vector control entity (VCE) that engages the RO coefficient matrix for use in performing vectoring in a plurality of symbol periods subsequent to the event in the DO period, the VCE further using the DO FEXT coefficient matrix to encode an updated RO coefficient matrix in view of the event.

7. A G.Fast communication system according to claim 6, further comprising:
   a plurality of RO lines, a subset of which RO lines are designated as a DO group of lines,
   wherein the central controller further causes the RO lines that are not in the DO group of lines to transmit IDLE symbols during the plurality of subsequent symbol periods instead of quiet symbols.

8. A G.fast communication system according to claim 6, wherein the VCE switches pointers between the RO FEXT coefficient matrix and the updated RO coefficient matrix after the updated RO coefficient matrix has been encoded, and further encodes an updated DO FEXT coefficient matrix in view of the event after the updated RO FEXT coefficient matrix has been encoded.

9. A G.fast communication system according to claim 8, wherein the VCE further engages the updated DO coefficient matrix for use in performing vectoring in a next DO period after the updated DO coefficient matrix has been encoded.

10. A G.fast communication system according to claim 9, wherein the central controller further causes the RO lines that are not in the DO group of lines to transmit quiet symbols during the next DO period instead of IDLE symbols.

\* \* \* \* \*